June 26, 1934. T. M. EDISON 1,964,197
MEANS FOR MAKING PERSPECTIVE DRAWINGS
Filed March 14, 1931 2 Sheets-Sheet 1
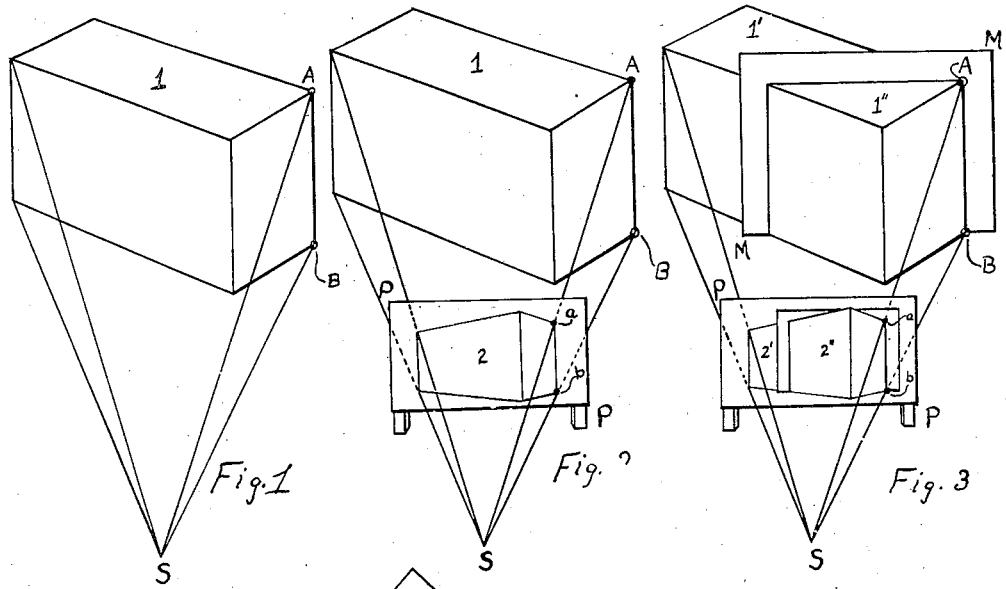
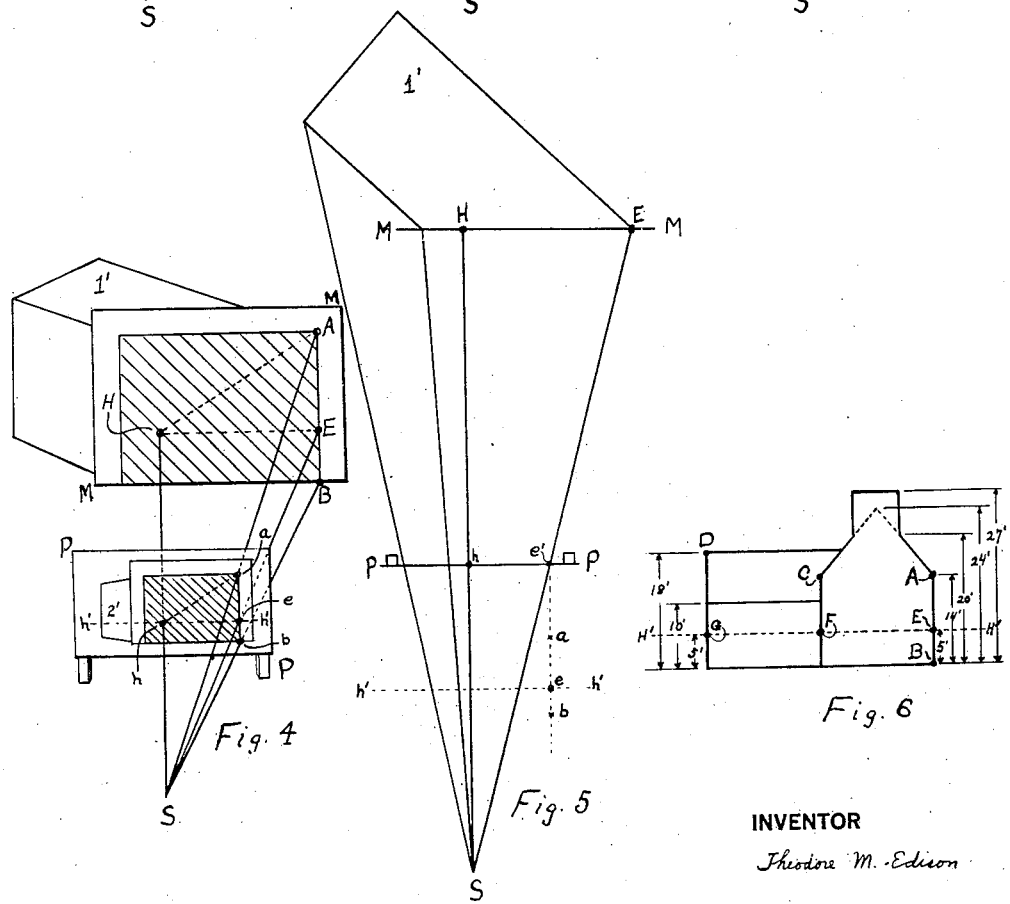
INVENTOR
Theodore M. Edison June 26, 1934. T. M. EDISON 1,964,197
MEANS FOR MAKING PERSPECTIVE DRAWINGS
Filed March 14, 1931   2 Sheets-Sheet 2
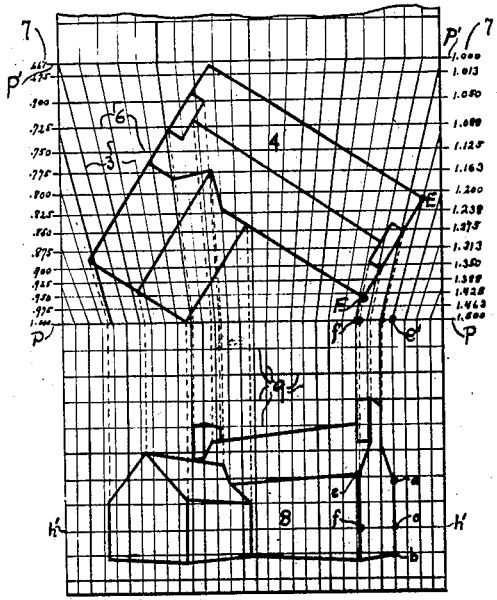
Fig. 7
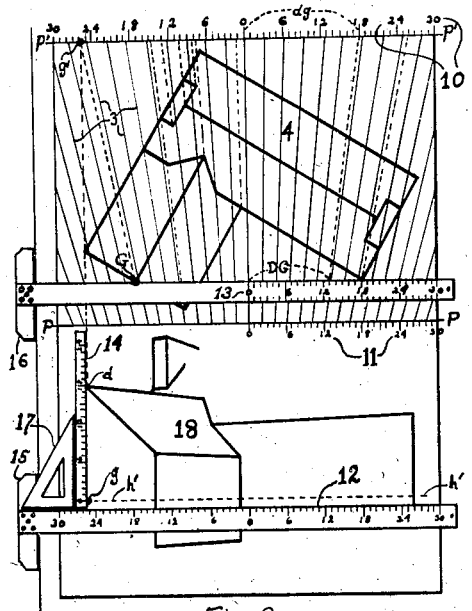
Fig. 8
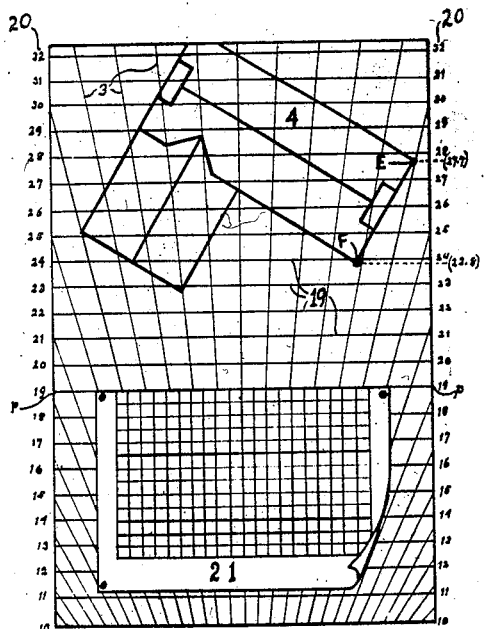
Fig. 9
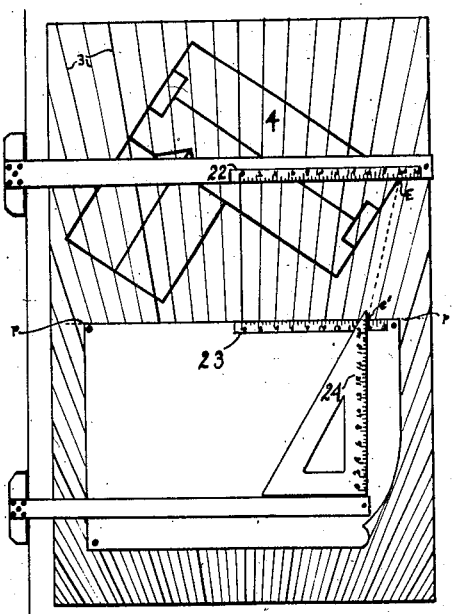
Fig. 10
Fig. 11
INVENTOR
Theodore M. Edison Patented June 26, 1934

1,964,197

UNITED STATES PATENT OFFICE 1,964,197

MEANS FOR MAKING PERSPECTIVE DRAWINGS

Theodore M. Edison, East Orange, N. J., assignor to Calibron Products, Incorporated, West Orange, N. J., a corporation of New Jersey Application March 14, 1931, Serial No. 522,730

3 Claims. (Cl. 33—1)

This invention relates to new and improved means for facilitating the operations involved, in making perspective drawings such means comprising novel linear systems adapted to permit quick and accurate determination of perspective measurements and positions.

Figures 1, 2, 3, 4, and 5 in the accompanying drawings are diagrammatic views for the purpose of illustrating the principles on which the new perspective method herein disclosed is based.

Figure 6 is as elevation of a building with vertical dimensions indicated.

Figures 7, 8, 9 and 10 are diagrammatic views showing the manner of using various linear systems in making perspective drawings in accordance with the present invention.

Figure 11 is the diagram of a form of tabulation that may be used with the linear system shown in Figure 9.

In perspective representations, the value of perspective measurements as compared to actual measurements, and the positions of perspective points as compared to the positions of actual points, are dependent upon the relative positions of the observer, of the object observed, and of the picture plane.

In Figure 1, S indicates the position of an observer looking along lines of sight such as SA and SB to points on a rectangular object 1 with vertical sides.

Figure 2 shows a vertical plane PP interposed between the observer and the object, and on this plane a picture 2 of the object has been drawn by joining points such as $a$ and $b$ where lines of sight pierce the plane. That a true perspective picture is thus obtained is proved by the fact that all parts of the object are shown in the apparent positions in which the observer would see them were he looking at the object itself.

Figure 3 shows the object cut into two portions 1' and 1" by a vertical plane MM, parallel to the picture plane PP and passing through the vertical edge AB of the object.

Figure 4 shows how the object would look after removal of the forward portion (1" in Figure 3) cut off by the plane MM. In this figure the triangles S$ab$ and SAB are similar, and therefore, by geometrical law, the ratio of the perspective height $ab$ to the actual height AB is the same as the ratio of the distance S$a$ to the distance SA, or, more concisely, $$\frac{ab}{AB} = \frac{Sa}{SA}.$$

The straight line S$h$H (Figure 4) represents a line from the observer's eye normal to the planes PP and MM. (As it is horizontal and at eye level, it determines the position of the horizon line $h'h'$ in the perspective drawing.) The triangles S$ah$ and SAH are similar and therefore $$\frac{Sh}{SH} = \frac{Sa}{SA}.$$

As shown in the preceding paragraph, $$\frac{ab}{AB}$$

is also equal to $$\frac{Sa}{SA},$$

and therefore $$\frac{ab}{AB} = \frac{Sh}{SH}.$$

In other words, the perspective distance $ab$ is equal to the actual distance AB multiplied by the factor $$\frac{Sh}{SH}.$$

In the same way it can be shown that all actual distances in the plane MM can be converted into the corresponding perspective distances in the picture plane PP by multiplying them by the single constant factor $$\frac{Sh}{SH}.$$

The principle just stated holds good for any plane parallel to the picture plane. For any such plane at a distance X from the observer, the perspective conversion factor will be $$\frac{Sh}{x}.$$

The conversion may be carried out in a number of different ways. In the various examples described below, fields of radial lines are provided for convenience in making some of the conversions by graphic multiplications; but the preceding paragraph shows that all the conversions may be carried out by numerical multiplications alone if desired.

Figure 5 is a plan view representing the scene shown in Figure 4 as it would look viewed from above. The planes MM and PP of Figure 4 are here observed edge-on, and therefore become the single lines MM and PP in the diagram. Any point, such as E, on MM may be projected directly to its perspective position $e'$ on the picture plane line PP. For convenience we may use the space directly below the line PP for the construction of the perspective picture, and this area will then represent the front elevation of the picture plane. As the points $a$, $e$ and $b$ (Figure 4) are all in the same vertical line, they will lie, in the perspective picture, somewhere along a line projected vertically downward from $e'$ (Figure 5). Any convenient location may be chosen for a horizontal line $h'h'$ to represent eye level (the horizon line) in the perspective picture. Since the point $e$ (Figure 4) is at eye level, it must lie on the horizon line, and is therefore definitely located by the intersection of the line $h'h'$ with the vertical line dropped from $e'$. The vertical distance of the point $a$ above the horizon line $h'h'$ may be determined by multiplying the known distance of A above eye level (the distance AE in Figure 4) by the perspective conversion factor $$\frac{Sh}{SH}.$$

In a similar way the distance of the point $b$ below the horizon line may be found. By following the same process for other points on the object, a complete perspective picture may be constructed.

To facilitate and simplify the application of the above principles to perspective drawing, I have invented special linear systems which may be printed or otherwise applied on opaque or transparent paper or on any other suitable and convenient material.

Each of the systems shown in Figures 7, 8, 9 and 10 includes a field of radial lines 3 which, if extended, would meet at a point located beyond the lower margin of the field. (The position of such focal point is purely arbitrary, and its choice is a matter of convenience and of pictorial effectiveness.) Plans or other representations of objects of known vertical dimensions may be drawn, traced, or otherwise positioned on, under, or over these fields of radial lines, as illustrated in Figures 7, 8, 9, and 10, in each of which the plan of a building 4 is shown so positioned. The known vertical dimensions of the building are indicated on the end elevation 5 thereof, shown in Figure 6, wherein the line H'H' indicates horizon level at the eye level of the observer.

Figure 7 shows a system comprising a series of horizontal lines 6 crossing the radial lines 3 and bearing marginal index numbers 7. Each of these horizontal lines represents the plan view of a vertical plane, parallel to the picture plane line PP. The index number borne by each such line is the value of the perspective conversion factor (described above) for all measurements in the plane represented by that line. The index numbers shown at the left hand margin of the field are calculated for the use of the line PP as the picture plane line, while those at the right hand margin are for use of the line P'P' as picture plane line. Either set of index numbers can be used for quick conversion of actual vertical distances at any point in the plan to corresponding perspective distances in the picture plane by simple multiplication. For instance, using the area below the line PP to represent the picture plane, and knowing (from Figure 6) that the upper corner A of the building at the point E on the plan is 9 ft. above eye level, the corresponding point $a$ can be located as a point .810 x 9 scale ft. above the horizon line $h'h'$ in the perspective picture 8, on a line projected from E along a radial line to $e'$ and thence vertically downward thru $e$. Similarly, the point $b$ in the perspective picture 8 is located .810 x 5 scale ft. below $e$ on the vertical line $e'e$, and the point $c$ is located .960 x 9 scale ft. above $f$ on the line $f'f$. All other significant points can be located in the same way in the perspective picture 8, and the picture can be completed by joining the points in their proper order.

Figure 7 shows the perspective picture 8 drawn on a field of cross-section lines 9 that is separated from the field of radial lines 3 by the line PP. This is a convenient arrangement but it is not essential, as the drawing surface may be either a separate or attached piece of paper or other material; it may either be blank or contain some useful markings such as cross-section rulings; and it may be placed as desired either above or below the field of radial lines or elsewhere at the user's convenience.

Figure 8 shows a field of radial lines 3 without horizontal lines, but with fixed scales 10 and 11 provided along upper and lower margins P'P' and PP of the field of radial lines. As in the system already described, projections may be made along the radial lines to either the upper or lower margin to obtain horizontal perspective locations. For example, the point G is projected upward to $g'$ on the picture plane line P'P', and thence vertically downward to locate the point $g$ on the horizon line $h'h'$. The long vertical projection may be eliminated by using the scale 12 to locate the point $g$ on the line $h'h'$. By the use of movable scales (such as 12, 13 and 14) in combination with T-squares 15 and 16, and triangle 17, or with cross-section paper (not shown) substituted for scales 12 and 14, perspective pictures may be accurately drawn,—vertical distances being determined by reference to actual projections of such distances to the picture plane line. For instance, in the perspective drawing 18 shown in Figure 8, the location of the point $d$ is determined as follows: the distance DG (known from Figure 6) is read on the scale 13 placed along a horizontal line thru the point G on the plan (Figure 8); the perspective value $dg$ of this distance is found by projection along radial lines to the scale 10 at the picture plane line P'P'; $d$ is located at this observed perspective distance $dg$ upward from $g$ on a vertical line thru $g$.

Figure 9 shows a field of radial lines 3 crossed by horizontal lines 19 bearing marginal numbers 20 which indicate the distances of the various horizontal lines from the focal point of the radial lines. In using this system, any line (such as $pp$) may be chosen as a picture plane line, and the factor $$\frac{Sh}{x}$$

for converting to perspective value a vertical distance at any point of the plan 4 can be calculated from the marginal numbers. For instance, since the line $pp$ bears the number 19, the value of $Sh$ is 19. The point E on the plan lies near the line numbered 28, so that the observed value for X is about 27.7, and the factor for converting a vertical distance at E on the plan to its correct perspective distance in the picture plane represented by the line $pp$ will therefore be $$\frac{19}{27.7}.$$

Similarly, at the point F on the plan the factor becomes $$\frac{19}{23.8},$$

and so on. For convenience, the drawing area may be a sheet of cross-section paper 21.

Figure 10 shows a system of radial lines 3 having neither horizontal lines nor fixed scales. Used with movable graduated measuring instruments (such as 22, 23 and 24) this system makes it convenient to locate a picture plane line at any desired distance from the focal point. In this case, as shown in Figure 10, a scale 23 (which may be a graduated measuring instrument such as a ruler, the edge of a sheet of cross-section paper, a scale specially printed on the edge of a sheet of drawing paper, or any other suitable and convenient device) is laid across the field of radial lines at any position selected for the picture plane line $pp$. Projections are then made to this picture plane line, and points in the perspective picture are determined in substantially the same maner as described in connection with Figure 8.

Figure 11 shows a convenient way of tabulating values of the factor $$\frac{Sh}{x}$$

for various locations of the picture plane line in a system such as that shown in Figure 9. In Figure 11, conversion factors 25, for each of a series of parallel lines represented by the column of numbers 26, are tabulated under each of a series of numbers 27 representing various locations of the picture plane line. In such a tabulation, factor values greater than unity would apply when the plan of the object is placed below the line chosen for the picture plane line, so that projections are made along the radial lines away from the focal point. Factor values less than unity would apply when the plan of the object is placed above the line chosen for picture plane line, so that projections are made along the radial lines toward the focal point. Other simplifying devices, such as conversion charts, special slide rules, etc., can readily be made up for use with any of the systems described in this specification.

I claim:

1. An article for use in making perspective drawings comprising means defining a field of radial lines converging at a point of view, on which field an orthogonal projection of an object may be superposed, and a scale on said field, each figure of said scale representing the factor by which a scalar distance opposite said scale and normal to said field is to be multiplied to give its corresponding value in a perspective projection of said representation, on a picture plane having a predetermined relation to said scale.

2. An article for use in making perspective drawings comprising means defining a field of radial lines converging at a point of view and parallel straight lines crossing said radial lines, one of said parallel lines representing a picture plane and the remainder planes parallel thereto, on which field an orthogonal projection of an object may be superposed, and a scale on said field having a predetermined relation to said picture plane, each figure of said scale being opposite one of said parallel lines and representing the factor by which a scalar distance lying in the plane defined by such line is to be multiplied to give its corresponding value in a perspective projection of said representation on said picture plane.

3. An article for use in making perspective drawings comprising means defining a field of parallel straight lines representing a picture plane and planes parallel thereto, on which field an orthogonal projection of an object may be superposed, and a scale on said field having a predetermined relation to said picture plane, each figure of said scale being opposite one of said parallel lines and representing the factor by which a scalar distance lying in the plane defined by such line is to be multiplied to give its corresponding value in a perspective projection of said representation on said picture plane.

THEODORE M. EDISON.